(12) United States Patent
Grenning

(10) Patent No.: US 7,738,672 B2
(45) Date of Patent: Jun. 15, 2010

(54) TECHNIQUES FOR VERIFYING THE AUTHENTICITY OF THE STEEL STAMPED INFORMATION ON AN ENGINE PAD OF A CLASSIC AUTOMOBILE AND APPARATUS THEREFOR

(76) Inventor: Albert R. Grenning, 318 Summit St., Boonville, NY (US) 13309

( * ) Notice: Subject to any disclaimer, the term of this patent is extended or adjusted under 35 U.S.C. 154(b) by 1295 days.

(21) Appl. No.: 11/124,024

(22) Filed: May 6, 2005

(65) Prior Publication Data

US 2006/0251288 A1   Nov. 9, 2006

(51) Int. Cl.
*G06K 9/00* (2006.01)
(52) U.S. Cl. ........................... 382/100; 109/115
(58) Field of Classification Search ............... 382/100, 382/109, 182, 115
See application file for complete search history.

(56) References Cited

U.S. PATENT DOCUMENTS

| | | | | |
|---|---|---|---|---|
| 3,682,608 A | * | 8/1972 | Hicks | 48/189.6 |
| 5,881,168 A | * | 3/1999 | Takaoka et al. | 382/180 |
| 6,075,894 A | * | 6/2000 | Yano et al. | 382/199 |
| 7,035,440 B2 | * | 4/2006 | Kaku | 382/115 |
| 2002/0124003 A1 | * | 9/2002 | Rajasekaran et al. | 707/100 |
| 2003/0033269 A1 | * | 2/2003 | Ebertshauser | 707/1 |
| 2003/0120922 A1 | * | 6/2003 | Sun et al. | 713/168 |
| 2004/0139827 A1 | * | 7/2004 | Micklich | 81/124.3 |
| 2004/0218089 A1 | * | 11/2004 | Heusinkveld | 348/370 |
| 2005/0053282 A1 | * | 3/2005 | Suen et al. | 382/182 |

FOREIGN PATENT DOCUMENTS

JP    11-132738    *   5/1999

\* cited by examiner

*Primary Examiner*—Vu Le
*Assistant Examiner*—Amara Abdi
(74) *Attorney, Agent, or Firm*—Kenneth M. Seddon

(57) ABSTRACT

Briefly, in accordance with one embodiment of the invention, a technique and device are described that may allow a user to determine if the engine in a classic or antique automobile is original. The common characteristics of the factory applied markings of known original engines may be identified. All or a portion of an unknown engine may then be compared to those common characteristics to determine if the unknown engine was likely stamped using the same stamping tool as the known original engines.

20 Claims, 13 Drawing Sheets

TECHNIQUES FOR VERIFYING THE AUTHENTICITY OF THE STEEL STAMPED INFORMATION ON AN ENGINE PAD OF A CLASSIC AUTOMOBILE AND APPARATUS THEREFOR

BACKGROUND

From 1953 through 1982, Chevrolet™ manufactured its Corvette™ automobiles in its manufacturing facility in St. Louis, Mo. (Chevrolet™ and Corvette™ are trademarks of General Motors Corporation, Detroit, Mich.). Beginning in 1955, Chevrolet™ incorporated a plan to address potential quality issues that might arise during the manufacturing process of particular engine options. Consequently, Chevrolet implemented the practice of stamping information on each engine manufactured. This information was individually hand stamped into each engine using a hammer and a stamping device 1 like the one illustrated in FIG. 1.

As shown in FIG. 2A, the engine code information was stamped onto an engine pad 10 of each engine 100. The use of these stamped engine codes began in both of the Chevrolet™ Corvette's™ V8 engine assembly plants beginning in 1955. One plant was located in Flint, Mich., while the other was in Tonawanda, N.Y. Both plants stamped a code relating to the specific manufactured application of the engine. In addition to engine assembly information stamped at Flint and Tonawanda, the car-line plant in St. Louis, Mo., Chevrolet™ stamped a derivative of the vehicle identification number (VIN), again using a hammer and a stamping device like the one shown in FIG. 1.

For example, in 1967 the Tonawanda factory built many V8 engines including Corvette™ specific 427 cubic inch versions. If one of these engines was to be assembled in the 390 horse power (hp) configuration for use in a car that had a 4-speed transmission and smog equipment, an assembly line operator at the factory would stamp the assembly code into engine pad 10 of engine 100 including a suffix of "IM" using stamping device 1. (see arrow 5 of FIG. 2A) This would confirm to workers in the Tonawanda or St. Louis engine manufacturing facility all of the specific sub-components needed for that engine assembly. The stamped assembly code was used to identify the specific application of every engine manufactured. Therefore, versions specific to Corvette™ would have its own suffix code designation.

Thus, Chevrolet™ used the engine stampings as a way to communicate assembly information as the engine and automobile was being built. Once the automobile left the factory, this information had served its intended purpose and was no longer used by Chevrolet™.

Today the Chevrolet™ Corvettes™ manufactured in the 1960's and 1970's are considered by many to be collector items. Like many collector items, the value of a piece depends, often in great part, on its condition and its originality. Given the rarity and popularity of these automobiles, many of these automobiles have become very expensive which, in turn, has created a motivation for some to forge or alter some automobiles in an effort to increase their value. Thus, there is a continuing need to be able to determine if the engine in an automobile is original or a reproduction.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

DETAILED DESCRIPTION

Figure 1:
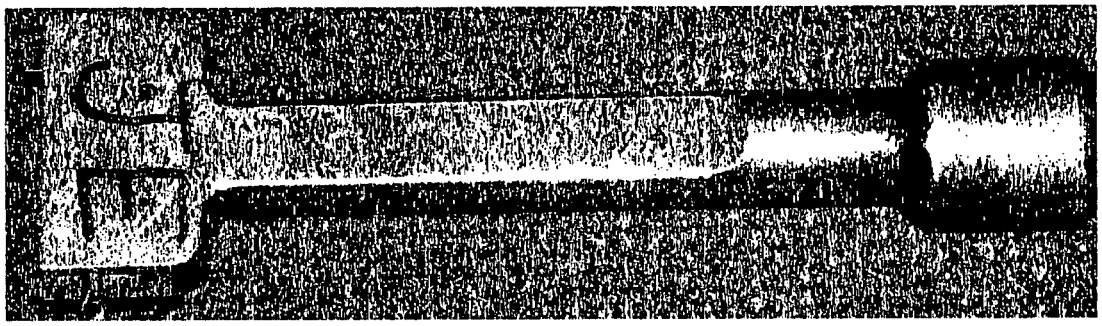
FIG. 1 is a picture of an utensil that may be used to stamp information into an engine pad.
Figure 1:
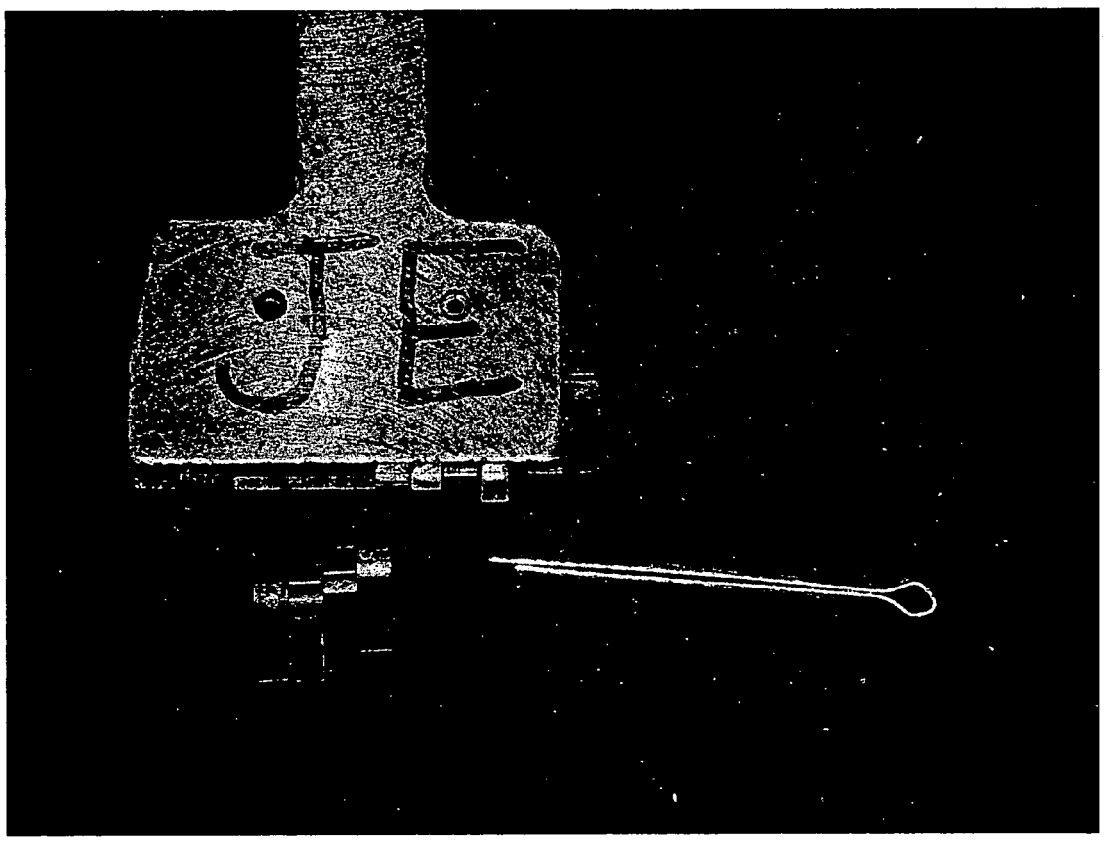

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

As explained in more detail below, the inventor has discovered another use for the engine information that Chevrolet™ placed on the engine pad of its engines. Through his extensive research that included a rigorous analysis of thousands of engines, researching factory documentation records, photographic analysis, etc, this information may be used to assess the value of an automobile.

More particularly, the inventor has discovered how this information may be used to determine the authenticity of an antique or classic automobile. It should also be noted that this use is one other than Chevrolet™ had ever envisioned, as Chevrolet™ has never provided any information on how to use the engine stampings for this alternative, newly discovered use.

For the purposes of this particular embodiment, reference is made to engines manufactured by Chevrolet™ for the particular intended use of being placed into Corvette™ automobiles. However, it should be understood that the scope of the present invention is not limited to this particular embodiment and that in alternative embodiments, the same or similar techniques may be used for engines used for other models manufactured by Chevrolet™. In addition, the same or similar techniques may be used for other makes of automobiles including, but not limited to, Ford, Chrysler, Mercedes-benz, Ferrari, etc.

Figure 2A:
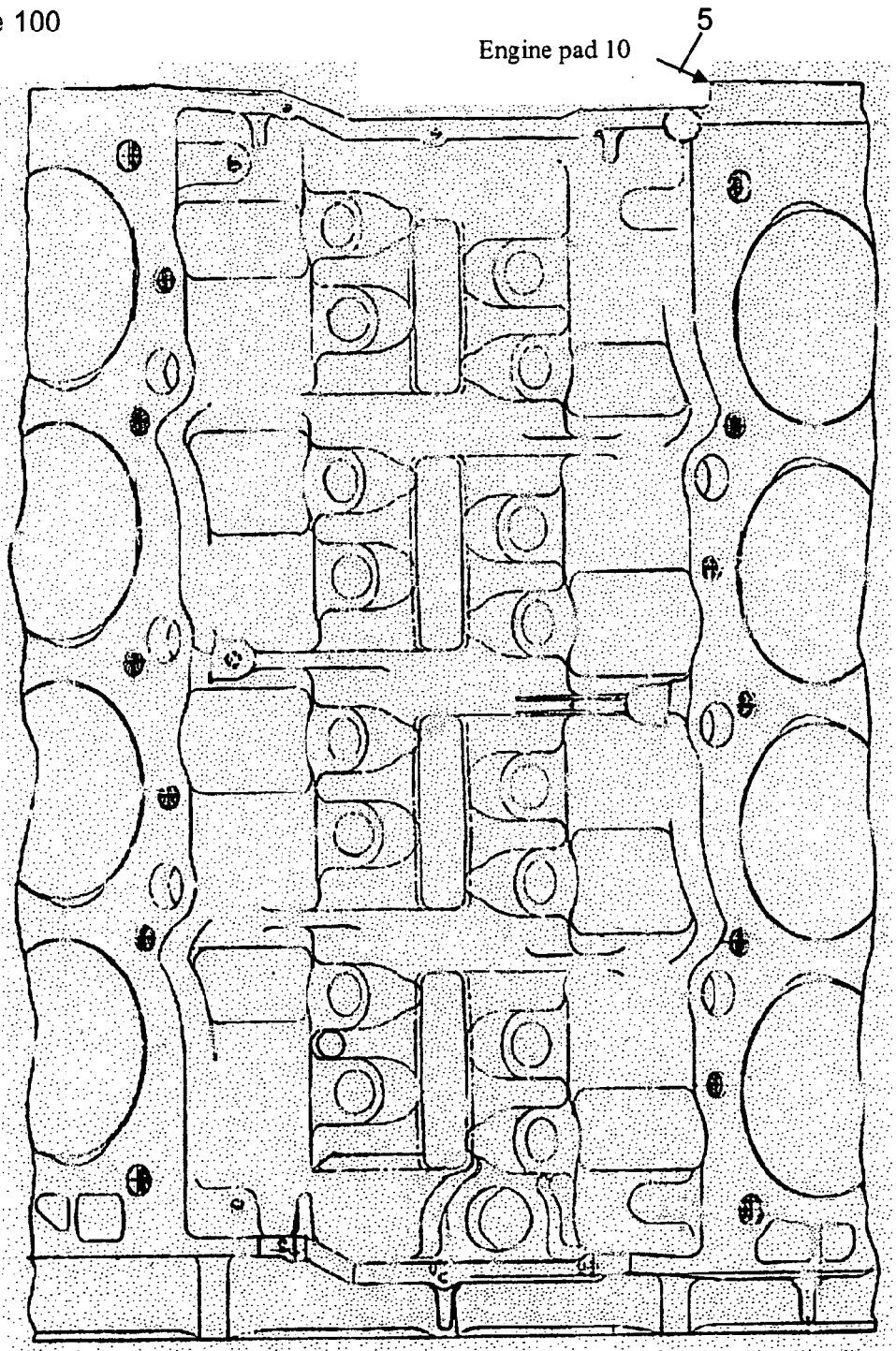
FIG. 2A is an illustration of an automobile engine provided to illustrate just one of many locations where information may be placed on the engine.

Chevrolet™ eight-cylinder engines manufactured at either of its two engine plants after 1954 would have production information individually hand steel-stamped using a stamping device (see FIG. 1) into an extension of flat machined surface on the front end of the right hand deck of the cylinder case (see FIG. 2A). This location is called the engine pad 10.

Figure 2B:
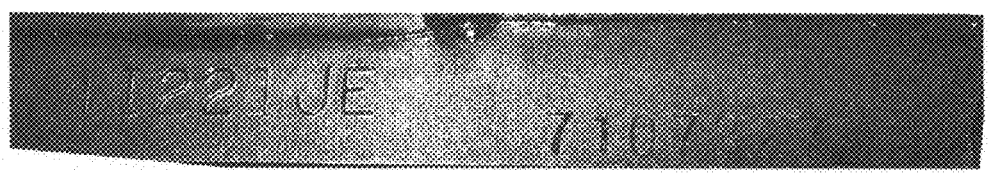
FIG. 2B is a photograph including the engine pad of a big block and a small block engine.

Two examples of 1967 Corvette™ engine pads 10 are shown in FIG. 2B. They represent both cubic inch displacements available during 1967 Corvette production. The upper example demonstrates the stamp configuration for 427 cubic inch version, while the lower represents 327 cubic inch version. These two are universally known as "big blocks" and "small blocks", respectively. For all versions and displacements, steel stamped pads are left with unique and specific information relating to each engine manufactured. For example, pad information indicates many options for that particular automobile in which it was to be installed. (E.g. automatic transmission, manual transmission, power steering, horsepower etc.) The assembly code may indicate plant location, date of assembly and application. Subsequently, at the final car-line assembly plant, a derivative of the full Vehicle Identification Number was struck adjacent to the assembly code.

Facing the engine from the front of the vehicle big block engines were stamped with assembly codes outboard (leftmost portion of the engine pad) while small block engines had assembly information inboard (rightmost portion of the engine pad). Chevrolet™ identified assemblies in this manor in order to track inventory in the manufacturing process as well as to aid record keeping of individual engines such as applied to each Corvette™ within its warrantee program.

Once the warrantee period passed, stamped information had no value what so ever to the Chevrolet™ Division of the General Motors Corporation.

When stamped, the machined pad surface typically lacked paint. Although the scope of the invention is not limited in this respect, engine pad 10 may be rectangular in nature and its size or surface area may vary somewhat depending on production year and cubic inch engine displacement. In many cases, engine pad 10 is between one and two square inches of surface area and may be an extension of the cylinder case beyond the valve covers.

Engine Pad 10 may be stamped with various coded information that was used by assembly workers in plant during the manufacture of engine 100 or the automobile that incorporated engine 100. This was the sole and only intended use for this information. For example, although the scope of the invention is not limited in this respect, engine pad 10 may include information to indicate where the engine was manufactured, when the engine was manufactured, the specific horse power configuration in which the particular engine was manufactured, what options were to be incorporated with the engine, what options were to be incorporated into the automobile having that engine, or the vehicle identification information (VIN) of the automobile.

Figure 3:
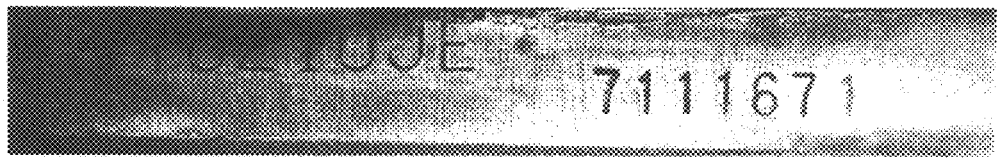
FIGS. 3-6 are black and white photographs of four engine pads from four different automobiles showing the same assembly date and suffix code.

FIG. 3 is provided as an example of a particular engine pad 10 from a 1967 Chevrolet™ Corvette™. In this particular case, engine pad 10 was steel-stamped with an engine assembly code "T0210JE". The "T" in the code indicates the engine was manufactured at the Tonawanda, N.Y., Chevrolet™ Engine Assembly Plant. The "0210" indicates that this particular engine completed assembly and was stamped on Feb. 10, 1967. The "JE" indicates that the engine was 427 cubic inches in size and that upon final assembly by the factory it was the version of engine that provided 435 horsepower.

With respect to Chevrolet™ Corvette™ manufacturing, once an engine was assembled in the Tonawanda factory, it was shipped to Chevrolet's™ St. Louis assembly plant where the engine would be placed into the appropriate Corvette™ as part of the final assembly process. Once installed in the appropriate Corvette™, engine pad 10 was again steel-stamped with a portion of the vehicle identification number (VIN) of that particular automobile. Referring to the photo of FIG. 3, engine pad 10 would be stamped with a "71" for 1967 Corvettes™ along with the 5-digit sequential number of the Corvette™ built. In the case of the engine shown in FIG. 3, this is the 11,671$^{st}$ Corvette™ built in 1967. Hence engine pad 10 would be stamped at the factory where the automobile was built with a factory applied marking of "7111671" which represents just a portion of the vehicle identification number.

Table 1 is provided below that lists the engine information about Corvette™ engine production as applied at the Tonawanda, N.Y., engine assembly facility. This information includes all engine options available to customers in model year 1967. Each line represents a specific combination of options for the listed horse power version. The "Engine Code" was the version or option of the engine as referred to by Chevrolet™ dealers. The "Suffix" refers to the letters stamped into engine pad 10 as part of the assembly code.

TABLE 1

| ENGINE CODE | SUFFIX | HORSEPOWER | PRODUCTION |
|---|---|---|---|
| BASE | HE | 300 | 4709 |
| BASE | HH | 300 | 334 |
| BASE | HO | 300 | 1725 |
| BASE | HR | 300 | 153 |

TABLE 1-continued

| ENGINE CODE | SUFFIX | HORSEPOWER | PRODUCTION |
|---|---|---|---|
| L79 | HT | 350 | 3226 |
| L79 | HD | 350 | 398 |
| L79 | HP | 350 | 34 |
| L79 | KH | 350 | 77 |
| L36 | IL | 390 | 4930 |
| L36 | IQ | 390 | 392 |
| L36 | IM | 390 | 341 |
| L36 | IR | 390 | 20 |
| L68 | JC | 400 | 1589 |
| L68 | JF | 400 | 253 |
| L68 | JD | 400 | 207 |
| L68 | JG | 400 | 52 |
| L71 | JE | 435 | 3190 |
| L71 | JA | 435 | 564 |
| L89 | IU | 435 | 14 |
| L89 | JH | 435 | 2 |
| L88 | IT | 430 | 20 |

Hence, deciphering the information shown in engine pad 10 of FIG. 3, the pad stamping represents a 427 cubic inch displacement, Corvette™ specific engine, rated at 435 horsepower with transistorized ignition and four speed manual, transmission.

From an investment or valuation standpoint, there are many factors that individuals may use to assess what a particular antique automobile is worth. Although the scope of the present invention is not limited in this respect, those factors may include: what horsepower configuration does the automobile have, what options come on the automobile (e.g. power steering, power brakes, air conditioning, etc.), how much of the automobile is original, and how many automobiles were manufactured with this particular configuration (i.e. how rare is the automobile).

As with any type of collector item, rarity is often the most significant factor. This is why original artwork is more valuable than lithographs or reproductions of the same artwork. The same is often true for classic or antique automobiles. The number of 1967 Corvettes™ that were manufactured by Chevrolet™ is fixed. More significantly, the number of Corvettes™ made in a particular configuration is fixed as indicated in Table 1.

In general, the greater the horsepower and associated options on a Corvette™, the more potential value is associated with a specific vehicle. All other factors being equal, Corvettes™ having greater horsepower engines with multiple options receive more interest from collectors and buyers than Corvettes™ with base engines. To help illustrate this point, in 2004 a 1967 Corvette™ having a base engine with a horsepower rating of 300 hp and few options (e.g. a suffix code of HE) would generally sell for about $35,000 to $50,000.

In comparison, another 1967 Corvette™ that was the same color, but instead had the L89 engine with 435 horsepower and the smog equipment option is easily worth $300,000 to $500,000. The 10× increase in value is due in great part to the rarity of the two vehicles. In the case of the Corvette™ with the base option, there were over 4,700 such cars made, whereas there were only 2 of the more valuable Corvettes™. In addition to rarity, the significant increase in horsepower is certainly a factor as well. Ironically, the two examples of Corvettes™ just described probably only varied in cost by about $1,500 when they were sold back in 1967.

As a reminder, the engine pad shown in FIG. 3 has the "JE" suffix indicating that the automobile has an engine with 435 horse power. In 2004, many such vehicles sold for over $150,000 depending on color, condition etc. Furthermore, it is worth mentioning that there are even examples of 1967 Corvettes™ that will soon exceed a value of 1 million dollars due to their rarity, desirability and collectability. Although every component of a classic Corvette™ may be important, many consider the originality of its engine to be central for market value and desirability. This fundamental principle may apply to all engine configurations and horsepower applications.

Given the dramatic variance in value that might exist between collector automobiles, there is the temptation for an automobile restorer to alter or modify the original factory configuration of an automobile in an effort to make it more valuable. For example, to make an automobile more desirable to a buyer, a restorer may take a Corvette™ with a base motor (327 cubic inches) and replace it with a 427 cubic inch motor. This is not difficult to do since 427 cubic inch motors were also widely used for trucks and boats. In addition, the restorer may also add options to the automobile in an effort to make the automobile appear to be one of the more rare Corvettes™.

Replacing, exchanging, or modifying the motor of an automobile is a rather trivial exercise for an experienced mechanic and may be done for as little as $3,000 to $10,000. As part of the installation process the mechanic may simply re-machine or "deck" the surface of the engine including the engine pad (e.g. engine pad 10). By grinding, broaching or sanding the deck surface, any existing characters or information on the engine pad (e.g. the engine assembly code) may be removed. In essence, the slate has been cleaned and any information that indicated how that particular engine left the factory when it was originally manufactured is removed. In doing so, any information that may indicate what options that particular automobile was originally assembled with may also be removed.

The mechanic may then simply re-stamp the engine pad with what ever information he or she desires. Stamping kits are readily available through the internet or many automobile hobby magazines. Thus, the mechanic may re-stamp the engine with a corresponding assembly code suggesting that the engine is one of the greater horsepower configurations and/or includes some of the more desirable options such as air conditioning, etc. In doing so, a restorer may take an automobile that was originally worth only $30,000 and alter its configuration to suggest the Corvette™ is worth significantly more. Since the vehicle identification number of the automobile has not been altered, this practice is generally not illegal in most states. It is important to emphasize that Corvette™ VINs (vehicle identification numbers) do not identify vehicle options until the 1970s.

The practice of re-stamping or altering the configuration of a classic automobile is akin to a counterfeit artist who attempts to recreate an original piece of artwork and sell it as an original. The reality is that if the perceived value of an automobile can be increased through the practice of re-stamping, there will always be some restorers willing to alter Corvettes™ from their original, factory configuration.

Figure 2B:
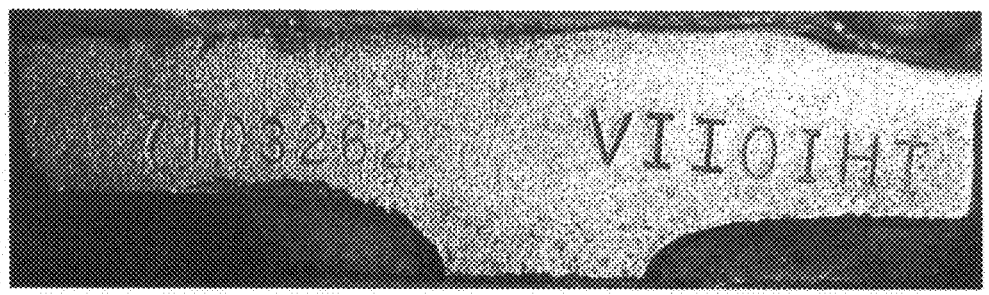

This is why a significant portion of the value of an automobile is not only the rarity of its particular configuration, but how original the automobile is as well. Thus, there is a need to be able to distinguish original engines from those that may have been altered or re-stamped. However, Chevrolet™ never intended the information on the engine pad (e.g. engine pad 10 of FIG. 2) to be used by the purchaser of a Corvette™ 20, 30, 40 years or more after the Corvette™ was manufactured. As further proof of this, Chevrolet™ applied short lived paper stickers to the right side valve covers on some Corvette™ engines in order to identify engine suffix codes on the assembly line. After short periods of service these stickers would fall away and their meaning lost forever. As explained above, the one and only applied use for the information on the engine pad was by those in the Chevrolet™ assembly plant to assist in manufacturing the automobile. Once, the Corvette™ left the assembly line, the information on the engine pad served its manufacturing purpose as far as Chevrolet™ was concerned.

Figure 4:

For the particular embodiment, although the scope of the present invention is not limited in this respect, reference is made to FIG. 4. FIG. 4 is a photograph of an engine pad of the engine of another 1967 Corvette™. In this particular photograph, the engine pad is from the 11,666$^{th}$ Corvette™ manufactured in 1967. It should be noted that this particular Corvette™ was just 5 Corvettes™ ahead of the one corresponding to the photograph of FIG. 3 on the Chevrolet™ assembly line. In all likelihood, both Corvettes™ were likely manufactured on the same day as Chevrolet™ manufactured, on average, approximately 200 Corvettes™ per day.

The engine assembly code information shown in FIG. 4 indicates that this engine was assembled in the 435 horsepower configuration, with a 4-speed transmission and transistorized ignition just like the Corvette™ corresponding to FIG. 3. The question is then, which, if any of the engines in FIG. 3 or 4 are original and which are possible re-stamped engines? Stated another way, if a buyer has the choice to purchase the automobile with the engine shown in FIG. 3 or the automobile shown in FIG. 4, and we assume everything else is equal (e.g. price, condition, color, etc.), which automobile represents the better investment? The answer to this question may depend in great part on which of the two automobiles has its original engine.

Taken individually, each engine appears to be properly coded and correct. Specifically, there is no way to determine by looking at just one of the engine stampings if it is authentic or if it is correct. Moreover, it should be noted that even 38 years after the engines were manufactured by Chevrolet™, Chevrolet™ has not provided any information to be used by Dealers, repair shops, or even consumers on how to determine if the stamping on a pad is original or a reproduction. Again, this should not be surprising since Chevrolet™ only used this information in the manufacturing process to indicate what components should be added to a particular engine or automobile as the engine and/or automobile passed through the assembly line. Therefore, in this example, both engines may be re-stamped engines, both may be re-stamped engines, or one may be original while the other is a re-stamp. In the case of the latter situation, the question then becomes which is original and which is a re-stamped or re-production?

The Inventor has discovered a technique to assist in answering that question. Although the scope of the present invention is not limited in this respect, the Inventor has discovered that through the painstaking process of gathering images of many engine pads and then comparing those images to each other, original and authentic engine stampings may be differentiated from non-original engine stampings.

Figure 5:
Figure 6:
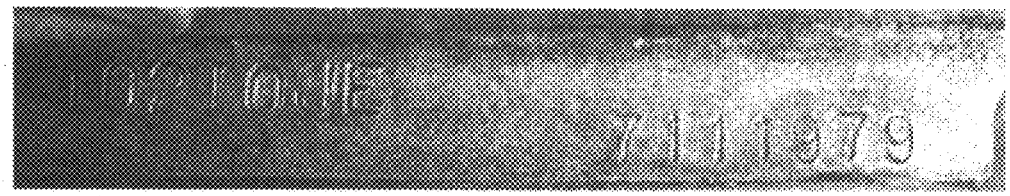

Continuing with this particular example, after significant effort, the Inventor has been able to gather images of four engines that were built within a week of each other over 38 years ago! In particular, FIGS. 5 and 6 are photographs of the engine pad of the 11,321$^{st}$ and 11,979$^{th}$ Chevrolet™ Corvettes™ manufactured in 1967.

Twenty years of research and data gathering confirms that Corvette™ engines were built on single assembly lines in both the Flint and Tonawanda Plants. The devices which stamped information (i.e. factory applied markings) comprised a holder with insert channel for character set up and alignment. (see FIG. 1) Each holder with suffix application was prepared at the onset of every production shift. Therefore, in the case of the engine plant assembly examples listed above, a holder with appropriate characters was created for each version listed by manifest at the start of every shift. In the case of steel stamped engine plant assembly codes, identical examples were struck for each individual work shift and suffix combination. Therefore, no two assembly codes will ever be identical except for strikes applied on the same specific date and shift. As an example, every 1967 435H.P assembly dated Feb. 10, 1967 was struck by the same holder and character set. For example, assembly code T0210JE was applied to each engine manufactured that day in the same configuration. Thus, the same assembly code and all of the inherent aberrations (e.g. fingerprint) may be found on every other engine struck on the same date. This is so because each date-suffix combination was made up by the operator from scratch at the beginning of each shift. Therefore, every original assembly code is unique to all others applied with the same suffix in each production shift.

By studying the images from many engines, the Inventor has discovered that the combination of holder and characters left identifiable stamped aberrations (i.e. common characteristics) for each shift—on every cylinder case with the same suffix code. These aberrations are much like the common characteristics that a human being has in their fingerprints. The contours of our fingers cause us to leave a fingerprint that has common characteristics and allows us to determine who left the fingerprint. This is done by comparison to a fingerprint that was left on file. If enough characteristics match, then it can be determined with high accuracy who left the fingerprint.

In this example, the Inventor has developed a technique to determine if the factory applied markings on an engine pad were created using the original stamping tool at the factory (i.e. is the fingerprint of the original tool), or if the stamping on an engine is the result of another stamping tool applied after the factory assembly (i.e. the fingerprint of another tool). If an engine pad is stamped without the same original holders and character sets, exact duplication of original engine stampings is not possible. Thus, the analysis can be used to determine if an engine has an original engine (i.e. fingerprint of the original manufacturer) or the engine is a re-stamp (i.e. the fingerprint of a restorer).

As will be made clear shortly, FIGS. 4-6 are examples of original engine pad strikes whereas FIG. 3 is likely an attempt to recreate an original engine. To begin, common characteristics between known original engine pads are identified. Although it should be understood that in alternative embodiments it may be sufficient to identify just one common characteristic. For example, one common characteristic of the factory applied markings of FIGS. 4-6 is that the first and last letters of the code, represented by "T" and "E" are the most pronounced of all seven characters in the engine assembly code.

Another common trait of these three engines is that the "2s" in FIGS. 4-6 have a tapered base leg the embodiment of which fades to a non distinct point. Another in these same examples is that the second "0" in the "IO" portion of the code has the least pronouncement in the lower right corner and the most in the upper left. Lastly, the 5 o'clock position on the bottom loop of the letter "J" embodies the least pronouncement in the authentic examples. Thus, by studying and comparing the images of the factory applied marking of multiple engines, one or more common characteristics may be identified.

The originality or authenticity of an unknown engine (e.g. the engine of an automobile that a buyer is considering purchasing, such as the one shown in FIG. 3) may then be determined by comparing the factory applied markings of the unknown engine to determine if the unknown engine includes one or more of the common characteristics of the known original engines. It should be noted that in this particular embodiment common characteristics were identified by comparing and confirming traits of multiple engines.

In alternative embodiments, it may be possible to determine if an unknown engine is original or authentic by simply comparing the factory applied markings of an unknown engine to the factory applied markings of a single known original engine. This may be possible if an automobile is owned by its original owner who is certain that the factory applied markings have not been altered. In yet other embodiments, the factory applied markings need not necessarily be compared by comparing just two photographic images. It may be possible to compare the trace rubbings of two engines by measuring other features of the factory applied markings. For example, the depth, lengths, width, etc. of the markings may be compared to each other using high resolution measurement tools.

Turning now to FIGS. 7-10, another embodiment of the present invention is provided. In particular, in addition to or alternatively from using the assembly code to determine if an engine pad includes original factory applied markings, all or at least a portion of the factory applied marking associated with the vehicle identification number may be used. FIGS. 7-10 are photographs of the engine pad of the $14,119^{th}$, $14,153^{rd}$, $14,165^{th}$, and $14,187^{th}$, respectively, Chevrolet™ Corvettes™ manufactured in 1967. It should be noted that it is very likely that all four automobiles were manufactured on the same day by Chevrolet™.

Although the scope of the present invention is not limited in this respect, in 1967 the factory applied markings associated with the vehicle identification code began with a seven "7" followed by a "1." The "7" indicates the build year (1967) while the "1" is a spacer. The VIN derivative is right justified and always uses five digit spaces corresponding to the sequence number the automobile left the assembly line. For example, VIN code "7114119 corresponds to the $14,119^{th}$ Corvette™ manufactured.

Figure 7:
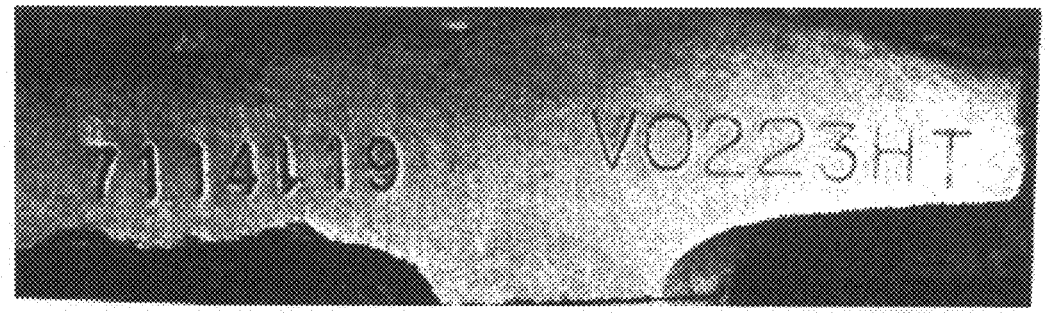
FIGS. 7-10 are black and white photographs of four engine pads from four different automobiles showing their VIN derivative code.
Figure 8:
Figure 9:
Figure 10:
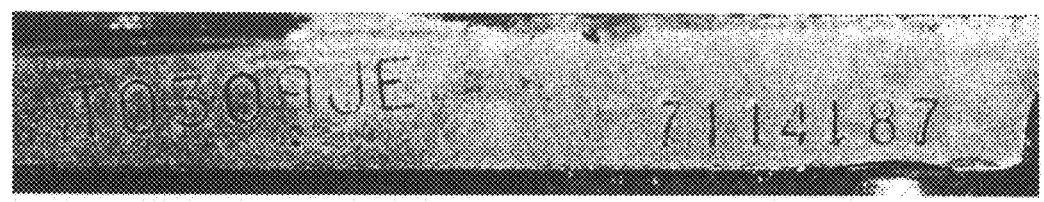

The photographs of FIGS. 8 and 10 are of Corvettes™ that were big blocks (i.e. have an engine with 427 cubic inches of displacement and the engine suffix "JE" that indicates the engine has 435 horse power (see Table 1). FIGS. 7 and 9 are photographs of the engine pad of small block engines (e.g. 327 cubic inch displacement). As discussed above, small block engines were manufactured at the Flint Assembly plant which put the engine assembly code on the rightmost portion of the engine pad. This is why the VIN code had to be stamped on the leftmost portion of the engine pad. The opposite is true of big block engines manufactured at the Tonawanda factory. Regardless of where the motor was assembled, the VIN derivative code was applied to the engine at Chevrolet's™ St. Louis assembly plant where the Corvette™ completed its final assembly before being shipped to Chevrolet's™ dealerships.

The VIN derivatives were applied to the engine pad manually by striking a holder-character set (e.g. see FIG. 1) with a five-pound hand mallet. Because Corvettes™ were manufactured consecutively the operator only had to advance the number character in the holder by one digit as each automobile moved down the production line. Therefore, as each vehicle's engine was steel stamped with its VIN derivative, the operator changed the right justified number in the holder by manually removing at least a single character and replacing it with the next proper numeral. Thus for every ten sequential automobiles, six characters remain identical. Even over a sequence of 100 consecutive engines, five of the left justified characters remain identical.

Comparing the factory applied VIN derivative of FIGS. 7, 9, and 10, it should be noted that the fifth digit has an inverted "1." Since this trait is common to different automobiles, it becomes clear that the worker in the assembly plant simply inverted this one character in the holder and then proceeded to stamp automobiles with the inverted character. Thus, there is one common characteristic or "fingerprint" of the original stamping device used to apply VIN derivatives to these automobiles. It should be noted that this common characteristic does not appear on the VIN derivative of the engine pad shown in FIG. 8. This would suggest that the stamping shown in FIG. 8 is not original. There are other common characteristics or markers that can be used to perform this analysis. In particular, the "4" of the engine pad of FIG. 8 has a more obtuse slope than the "4" in the other examples. Furthermore, it can be seen that "5" in the example shown in FIG. 8 is wider in style in comparison the original, taller "5" in the example of FIG. 9.

It should be noted that the image of the engine pad of FIG. 9 includes an engine assembly code of "HE." This refers to an engine that has the lowest horse power manufactured by Chevrolet™ in 1967. It also likely indicates an automobile that has very few options. In other words, the image is not that of an engine that would increase the value of an automobile and is not likely the work of a restorer. This lends further credibility to the conclusion that the factory applied markings shown in FIG. 9, and thus FIGS. 7 and 10, are original. This illustrates that much may be learned by studying the engine stampings from automobiles that have less value and that are less likely to include a re-stamped engine.

As can be seen by this example, the factory applied VIN derivative was applied at the assembly plant using a stamping tool that has unique and repeatable characteristics that can be identified. In other words, with research it is possible to capture the "fingerprint" of the stamping tool used by Chevrolet™ and applied to original engines. These markers or aberrations are the result of uniquely malformed or worn characters, and holders. Every stamped original engine pad represents extended sequences of consecutive VINs with easily identifiable patterns of unique aberrations, idiosyncrasies and characteristics. By collecting and comparing the images of various factory applied markings on engines, common characteristics of original engines may be identified. These characteristics may be used to authenticate, verify, confirm and substantiate original factory installed Corvette™ engines.

In the examples described above, common characteristics of engine assembly codes and or VIN codes may be used to determine if an engine is original. However, it should be understood that the scope of the present invention is not limited to just using these two pieces of information on an automobile. In alternative embodiments, there are many other markers or aberrations that may be used to describe the "fingerprint" of original engines. Just some of those characteristics are listed and described below. Although, the scope of the present invention is not limited in this respect, some of these characteristics may be found on engines manufactured by Chevrolet™ from 1957 through 1975. Some or all of these characteristics may be found on engines made for other makes and models as well.

Character Size

The physical size of the characters may be limited by the size of the base opening of the stamp holder receiving the characters used to apply factory markings (e.g. assembly codes) to an engine. The base size for all assembly codes for engines of 1963 to 1967 Corvettes™ is one quarter inch. The character size for all VIN derivatives is three sixteenths of an inch. Therefore, in order to conclude that an engine includes original factory applied markings, the dimensions and size of the characters must be consistent with these measurements. It should be understood that the size of the characters may vary depending on the make and model of the automobile as well as the engine type in alternative embodiments.

Figure 20:
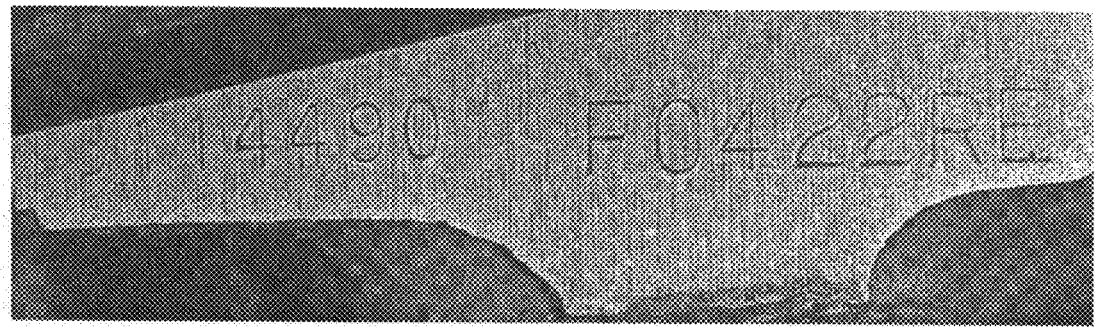
FIG. 20 is black and white photographs illustrating character sizes in accordance with an embodiment of the present invention.
Figure 20:
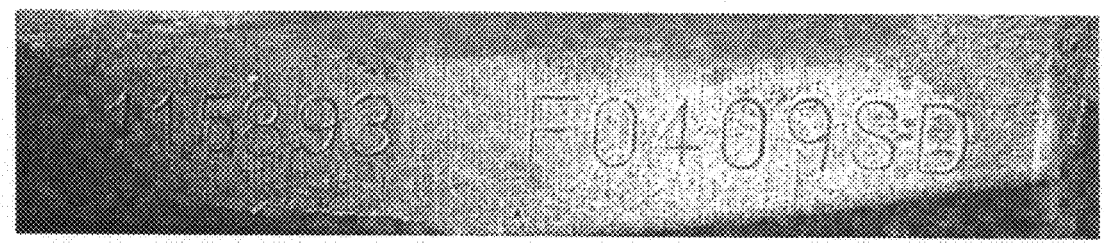
Figure 20:

Referring to the images of FIG. 20, the significance of departures from original factory stamping size is explained. In the upper two images, engine pad stamping 3114490 and 3115893 are shown to have larger than normal characters. This is very easily affirmed by comparison to an original factory stamped engine block 3100264 shown in the lower image.

In the case of 3114490 the VIN characters appear to be significantly taller than original strikes as demonstrated in 3100264. In the case 3115893 the VIN characters appear to be both wider and taller than the original demonstrated in 3100264. In addition to character size both 3114490 and 3115893 show obvious departures from original character style as demonstrated 3100264.

Character Style

Character style is analogous to font styles in typing and printing. Since only certain styles of character fonts were likely used in the steel stamping of Corvette™ engines, confirmation of original factory applied markings may be affirmed by comparison to data bases of the known original examples. In 1965 Chevrolet™ big block engines had 396 cubic inches of displacement and this was increased to 427 in 1966. From 1963 through 1967 small block engines had 327 cubic inches of displacement.

As described above, these engines could be manufactured in a variety of combinations depending on the horse power, options, etc. desired. Thus, there was a variety of engine suffix codes (see Table 1 for the 1967 list). The engine suffix codes often included the characters "F", "V", "H", "I" or "J". More particularly, the more desirable engine suffix codes included the pair of characters of "IM", "IQ", "IR", "IF", "IP", "IK", "JC", "JF", "JD", "JG", "JE", "JA", "IU", "JH", and "IT". "F", "V", and "T" were characters used at the beginning of assembly codes. "F" was the initial letter indication for the Flint small block plant. "V" became the letter indication for the Flint small block plant in 1967 and beyond the 1970s. "T" was the letter indicating the Tonawanda big block plant in western New York State. By studying and verifying the font characteristics of the individual or paired characters, it may be possible to verify if the factory applied markings of an engine are original.

Figure 21:
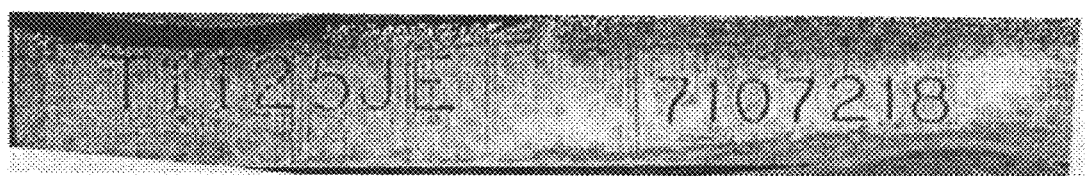
FIG. 21 is black and white photographs illustrating character styles in accordance with an embodiment of the present invention.
Figure 21:
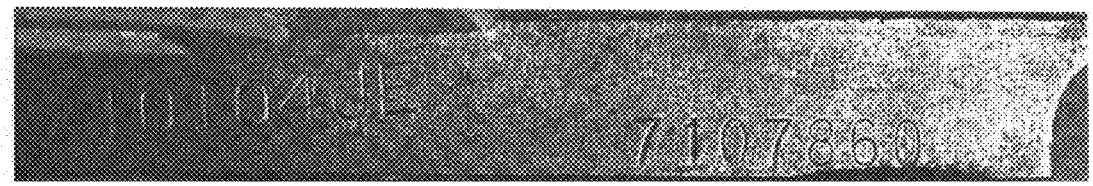

In the two examples shown in FIG. 21, VINs 7107218 and 7107860 the differences between factory applied identification characters is immediately obvious. The height to width ratio of 7107218 VIN characters is much broader than the factory original application of 7107860. It is important to note that style variation from original examples always incorporates a degree of dimensional distortion.

Character Boldness

The boldness (i.e. depth and or width) of characters in the VIN derivatives, assembly codes, or other factory applied marking may be a factor for determining the originality of an engine. As described above, many of the characters inserted into a stamp holder were used for specific engine applications or continuous sequences of automobiles manufactured during a particular shift or day. At times the more commonly used characters may become worn compared to the less frequently used ones. Particularly considering the amount of force it takes to embed the markings into an engine. Thus, their relative depth or location of the characters in the holder with respect to each other may vary. These variations may result in some characters being more or less bold than others in the factory applied markings. Thus boldness aberrations may be a common characteristic used to evaluate if an engine is original.

Character Junctures

In general, the characters used in the stamping devices were not manufactured to very high tolerances. After all, the characters need only be legible so the operators working on the line would be able to read them and understand the assembly information they conveyed. Accordingly, the characters may vary in their vertical alignment and may not be precisely parallel with each other. For example, if lines are drawn tangential to the lowest point and highest points of each character, two lines with six different slope angles will be apparent. These angle patterns may be common to original engines.

Character Twists

Due to wear of the holders and characters used in mass production considerable "slop" may be introduced into the character holder. This may cause sideways spacing to be less than intended. Consequently, characters in the stamp holder may "lean" in a consistently crooked manor. This may also occur if one character in the holder is deformed and causes the others to be out of alignment. Thus, twisting of the same character or characters in known original motors manufactured during the same time period would be expected to share this common characteristic.

Figure 22:
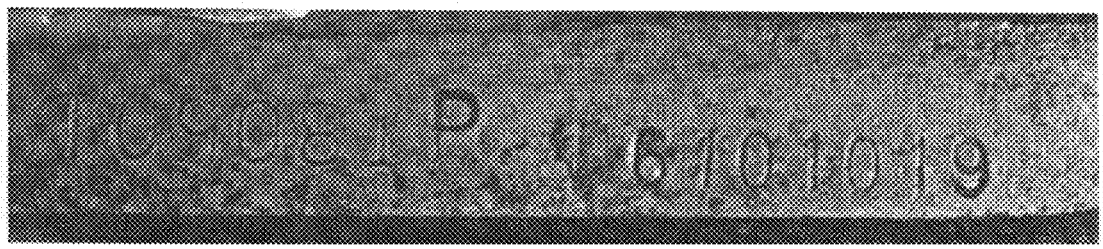
FIG. 22 is black and white photographs illustrating character twists in accordance with an embodiment of the present invention.
Figure 22:
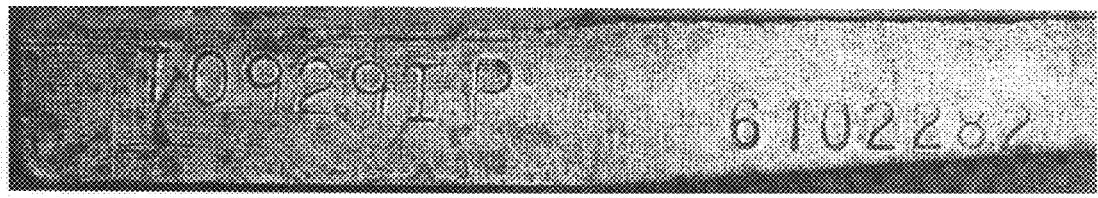

Character twists may be caused by the same reasons as juncture anomalies. With wear and other deviations from high tolerances assembly codes and VIN derivatives were struck with characters that tilt or lean in predictable directions. These idiosyncrasies are uniformly present in long and continuous sequences of stampings. In the two instances shown in FIG. 22 the second character "1" (one) in the VIN derivative leans toward the third spaced character. Long sequences of tilting characters may be extremely valuable for determining originality.

Character Spacing

Again, because of a lack of quality control the face of individual characters may not be "centered" on their shoulders (i.e. within their space). As a result there may be gaps between some characters that are larger than the gaps or space between others. One would expect that this would be repeated when applied to engines manufactured during the same time period or sequential to each other. This would be the case since there may not have been changes to the characters in the stamp holder.

Figure 23:
FIG. 23 is black and white photographs illustrating character spacing in accordance with an embodiment of the present invention.

Character spacing has similar causes as twists and juncture abnormalities. In the VIN derivative examples shown in FIG. 23, VINs 7116383 and 7116801, separation of the second and third place "1s" can be seen to be inconsistent. In a similar way to the earlier twist examples the tops of the "1s" are continuously closer together than all other characters.

Stamp Location

Due to the size and or shape of the stamp holder, steel stamped information applied at a factory was typically placed in certain locations on the stamp pad surface (e.g. engine pad 10 of FIG. 2A). For example, the VIN derivative was applied to the engine pad of a Chevrolet™ Corvette™ after the cylinder heads were on the engine. Consequently, the VIN derivative on original engines cannot extend under the cylinder heads. Thus, the location of factory applied markings may, in some embodiments, be used to determine if an engine is original or authentic.

Relief Angle

The relief angle embodies the measured acute angle forced into the cast iron surface of the engine pad when struck by the stamping process. The relief angle was a specified by Chevrolet. Impressions of steel stamped information applied by mechanisms other than original characters and holders may be readily confirmed by reference to examples of relief angles in the MPL. An explanation of the Master Pad Library (MPL) follows.

Figure 24:
FIG. 24 is black and white photographs illustrating relief angle in accordance with an embodiment of the present invention.

Character relief angle refers to the shape of the wedge forced into the surface of the engine pad by the steel stamping process. Non original stampings very often leave fine thinly struck character features. This may give the appearance of very light or faintly applied information. As can be seen in the application of VIN derivative 7116508 in comparison to original strike 7101559 as shown in FIG. 24, the impression left in the surface of the original engine pad is more robust and profound. This bold character application is a consistency found in many original engine pads.

Pad Broach-Machining Marks

Broach marks is the term used to describe the finished surface of the engine pad as a result of the machining process in preparing the raw cylinder case casting. During the manufacturing process, the two top surfaces of the cylinder case were surface dressed by huge hydraulically operated broaching machine the size of a city bus. Although the scope of the present invention is not limited in this respect, in the case of Chevrolet™ engines the surface of the engine pad is shared with the top surface of the passenger side deck of the cylinder case.

Consequently the broaching process left fine lines or broach marks that run parallel with the center line of the engine. Sometimes these original machining marks may be very faint due to age and deterioration. When present they may be described as being parallel with the crankshaft. Several hundred are normal for one inch of surface area. Besides having a parallel appearance they may also give the appearance of having striations or skips. This results from the crystalline nature of the cylinder case material which is cast iron.

These broach marks may be difficult to reproduce by a restorer when an engine is decked so as to remove the original characters stamped on a cylinder case. Most tooling equipment today leaves circular marks on the pad surface which is an indication that the engine does not include the original factory applied markings. Thus, broach markings, either alone or in combination with other characteristics described above may be used to determine if an unknown motor is original and authentic.

In developing the techniques described herein to determine if an engine in an automobile is original, the Inventor has collected and organized a huge data base of Corvette™ engine pad photographs. The images represent examples displayed at thousands of Corvette™ events, venues and private inquiries. Emulsion photography includes use of state of the art Nikon macro optics, special flash illumination, as well as Zeis digital optics.

Some of the images shown in FIGS. 3-10 where captured using a digital camera that was positioned about 6-12 inches from the surface of the engine pad. Others were taken using traditional photographic techniques. Modern digital cameras have built in features with aids like auto focusing and exposure compensation. These may allow images to be taken in a shorter time than traditional emulsion exposures. However, traditional emulsion photography using manual exposures and shutter speed setting remains fundamental.

Using this equipment the Inventor devised a technique by which stamped engine pad information could be photographed at any event in any lighting configuration. Concurrent, with the emulsion system, a duplicate system using 5 megabyte digital photography may also be used.

Although the scope of the present invention is not limited in this respect, all these images have been gathered in both hard copy prints and in digital format to create a Master Pad Library (MPL). Using the MPL major sequential aberrations, character styles, font aberrations, relief angles, strike location, juncture lines, location, and other characteristics may be used to determine the originality of a classic Corvette™ engine originality.

Figure 11:
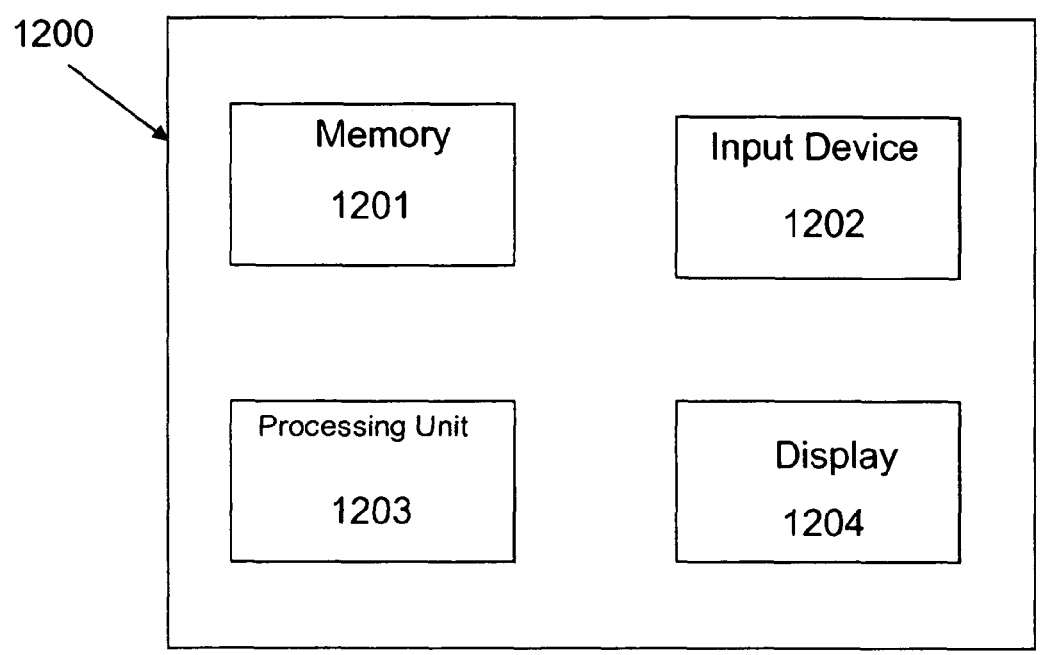
FIG. 11 is a block diagram representation of a device that may be used to store images or compare images to determine if an engine is original.
Figure 12:
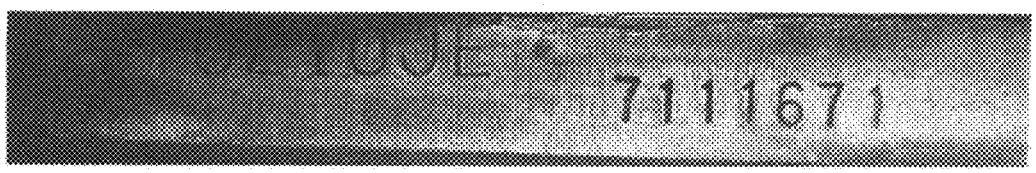
FIGS. 12-19 are color photographs of the images shown in FIGS. 3-10.
Figure 13:
Figure 14:
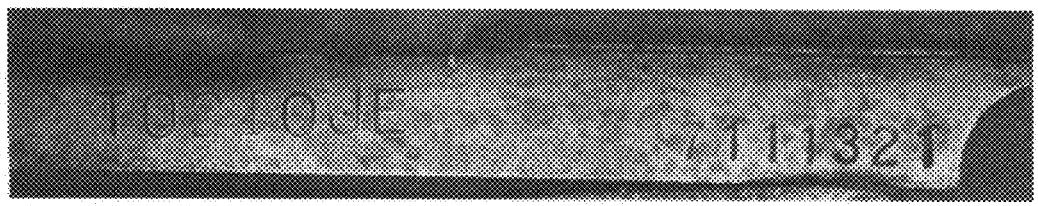
Figure 15:
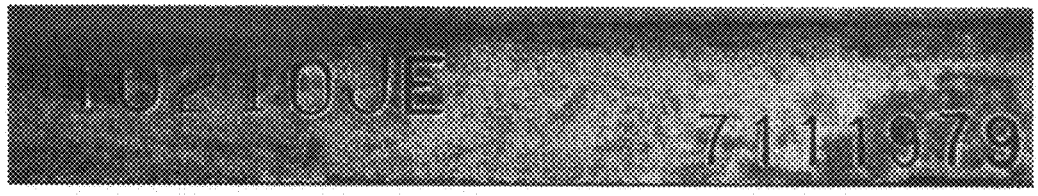
Figure 16:
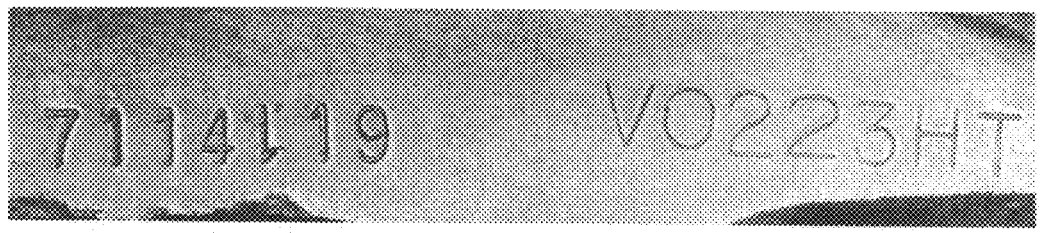
Figure 17:
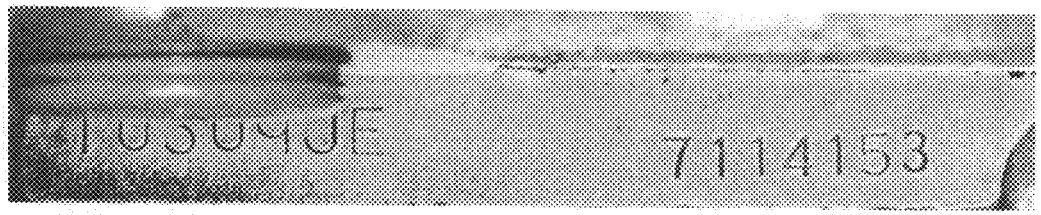
Figure 18:
Figure 19:
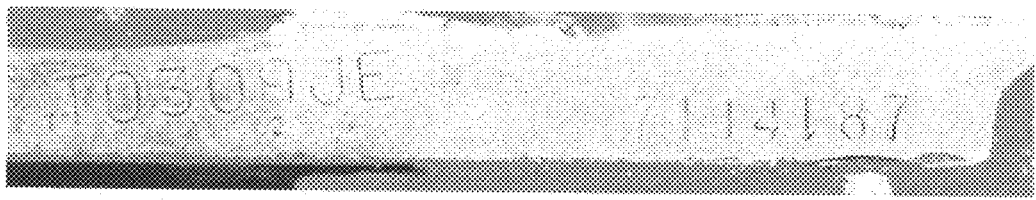

The characteristics of a known original engine may even be used to determine the authenticity of an engine that has rare factory defects. For example, occasionally when an engine pad was stamped at the factory, the worker may cause a double strike (i.e. the appearance of a second, lighter sequence of the same stamp) if the hammer were to bounce twice on the stamp holder. Alternatively, if an engine were stamped by an operator with incorrect information (e.g. the operator failed to change the appropriate character(s)), then the incorrect characters may be ground out, and the correct information reapplied. Even in these situations, the remaining characters may be compared against those of a known original pad to determine if there are enough common characteristics to provide a satisfactory confidence level that the engine under analysis is original Turning now to FIG. 11, a device 1200 in accordance with an alternative embodiment of the present invention is described. Although the scope of the present invention is not limited in this respect, device 1200 may be a portable electronic device like a personal computer, a digital camera, or a personal digital assistant. As explained below, device 1200 may be used to capture and/or store images of factory applied markings of engines of automobiles. Alternatively or additionally, device 1200 may be used to capture the image of the factory applied markings of an unknown engine and compare it to the image(s) of known original engine(s) to determine if the unknown engine is original or authentic.

In this particular embodiment, device 1200 may include a storage unit 1201 that may be used to store the images or other representations of factory applied markings of engines. For example, storage unit 1201 may be provided using any of the storage technologies described above and may be used to store a Master Pad Library or just one or a few images of original engines. In this embodiment storage device 1201 may be fixed within device 1200. However, it should be understood that in alternative embodiments storage unit 1201 may be provided using a portable memory device such as a portable memory card or the like.

Device 1200 may also include an input device 1202 that may be used to capture the image of all or a portion of the factory applied markings of an unknown engine. For example, input device 1202 may be a scanner, a camera, or a memory reader, although the scope of the present invention is not limited in this respect. In this particular embodiment, input device 1202 may be used to record the factory applied markings for future use such as to be added to the Master Pad Library. In such embodiments, input device 1202 may be arranged to provide a representation suitable for comparison analysis using the capturing techniques described above. Thus, the images of unknown engines may be captured by input device 1202 and then stored in storage unit 1201.

In yet other embodiments, device 1200 may include a processing unit 1203 such as a microprocessor, microcontroller, or the like, although the scope of the present invention is not limited in this respect. Processing unit 1203 may be used to compare the representation of an unknown engine to one or more stored in storage unit 1201 to determine if the unknown motor is original. For example, processing unit 1203 may employ the same or similar techniques for comparing an image of a finger print to those stored in a database to identify the person from whom the fingerprint came.

More particularly, processing unit 1203 may compare all or a portion of the factory applied markings provided by input device 1202 to one or more common characteristics of the images stored in storage unit 1201. As described above, an original engine pad may have many characteristics that can be used for comparison to determine if an unknown engine pad shares those characteristics, which would suggest that both engines were stamped using the same tool at the factory, and thus, are both original.

The number of characteristics that are used by processing unit 1203 to determine originality may be varied as desired. For example, processing unit 1203 may simply compare the font of one character of the unknown engine to the font of one character from a single engine known to be original. Such an analysis may provide a satisfactory confidence factor that the unknown engine is original. Alternatively, the number of common characteristics that are used along with the number of images of known original motors may be increased to provide a greater confidence factor that the unknown engine is original.

Thus in one embodiment, device 1200 may not be much more than a storage medium that has stored on it one or more images of factory applied markings from engines that are believed to be original. Device 1200 may allow the user to display those images on a display 1204 (e.g. an liquid crystal display (LCD) so that the user can then visually compare the factory applied markings of an unknown motor to those stored in device 1200 (e.g. displayed side by side or overlaid upon one another).

In other embodiments, processing unit 1203 may perform an analysis of the image of an unknown engine to those stored in storage unit 1201 to determine and notify the user if the unknown engine is original with a particular confidence factor. It should be understood that the scope of the present invention is not limited to the particular technique used by processing unit 1203 to compare the images. In some techniques, processing units may simply overlay two or more images and perform a bit by bit analysis to derive a confidence factor. In other embodiments, processing unit 1203 may use techniques similar to voice recognition, face recognition, fingerprint recognition, etc. to provide a higher confidence factor. These techniques may allow for common aberrations and inconsistencies in factory applied markings that may occur between engines while at the same time informing the user whether or not the factory applied markings of the unknown motor are identical or substantially similar to those stored in device 1200.

It should be understood that in the description above specific reference was made to comparing factory applied markings of engines in Chevrolet™ Corvettes™. It should be understood that the scope of the present invention is not limited to this particular engine or analysis. The same techniques described herein may also be used for other makes and models of automobiles.

| Other Applicable Chevrolet Models and Makes | |
|---|---|
| Corvair | Greenbrier |
| Biscayne | Kingswood |
| Chevy II | Townsman |
| Chevelle | Brookwood |
| Bel Air | Concours |
| Impala | Camaro |
| Caprice | Super Sport |
| Nova | El Camino |
| Mailbu | |
| Other Applicable Non-Chevrolet Models and Makes Chrysler Corporation | |
| Dodge Dart | Plymouth Barracuda |
| Dodge Coronet | Plymouth Road Runner |

Furthermore, the scope of the present invention is not limited to the analysis of the Corvette™ engines manufactured in 1967. This technique may be used for any year that Chevrolet™ applied markings to engines and automobiles. Table 2 is provided below to list the engine suffix codes of the various engines manufactured in other years.

TABLE 2

1963 Corvette Engine Applications

| ENGINE CODE | SUFFIX | APPLICATION |
|---|---|---|
| Base 250 HP | RC | Manual transmission |
| Base 250 HP | SC | Powerglide |
| L75 300 HP | RD | Man. Trans., Hi-Per. |
| L75 300 HP | SD | Powerglide, Hi-Per. |
| L76 340 HP | RE | Man. Trans., SHP |
| L84 360 HP | RF | Man. Trans, Fuel Injec. |

TABLE 3

1964 Corvette Engine Applications

| ENGINE CODE | SUFFIX | APPLICATION |
|---|---|---|
| Base 250 HP | RC | Manual transmission |
| Base 250 HP | RP | Man. Trans,. A/C |
| Base 250 HP | SK | Powerglide, A/C |
| Base 250 HP | SC | Powerglide |
| L75 300 HP | RD | Man. Trans., Hi-Per. |
| L75 300 HP | RQ | Man. Trans., A/C, Hi-Per |
| L75 300 HP | SD | Powerglide, Hi-Per. |
| L75 300 HP | SK | Powerglide, A/C. Hi-Per |
| L76 340 HP | RE | Man. Trans., SHP |
| L76 340 HP | RR | Man. Trans., A/C, SHP |
| L76 340 HP | RT | Man. Trans., TI, SHP |
| L76 340 HP | RU | Man. Trans., TI, A/C, SHP |
| L84 375 HP | RF | Man. Trans, Fuel Injec. |
| L84 375 HP | RX | Man. Trans, Fuel Injec., TI |

TABLE 4

1965 Corvette Engine Applications

| ENGINE CODE | SUFFIX | APPLICATION |
|---|---|---|
| Base 250 HP | HE | Manual Transmission |
| Base 250 HP | HI | Man. Trans., A/C |
| Base 250 HP | HO | Powerglide |
| Base 250 HP | HQ | Powerglide, A/C |
| L75 300 HP | HF | Manual Transmission |
| L75 300 HP | HJ | Man. Trans., A/C |
| L75 300 HP | HP | Powerglide |

TABLE 4-continued

1965 Corvette Engine Applications

| ENGINE CODE | SUFFIX | APPLICATION |
| --- | --- | --- |
| L75 300 HP | HR | Powerglide, A/C |
| L76 365 HP | HH | 4 speed |
| L76 365 HP | HK | 4 speed, A/C |
| L76 365 HP | HL | 4 speed. TI (Trans. Ign.) |
| L76 365 HP | HM | 4 speed, TI, A/C |
| L84 375 HP | HG | Fuel Injection, 4 speed |
| L84 375 HP | HN | Fuel Injection, 4 speed, TI |
| L78 425 HP | IF | 4 speed, TI |

TABLE 5

1966 Corvette Engine Applications

| ENGINE CODE | SUFFIX | APPLICATION |
| --- | --- | --- |
| Base 300 HP | HE | Manual Transmission |
| Base 300 HP | HH | Man. Trans., A.I.R.* |
| Base 300 HP | HO | Powerglide |
| Base 300 HP | HR | Powerglide, A.I.R. |
| L79 350 HP | HT | 4 speed, Hi-Per |
| L79 350 HP | HP | 4 speed, P.S., A/C, Hi-Per |
| L79 350 HP | HD | 4 speed, A.I.R. |
| L79 350 HP | KH | 4 spd, A.I.R.. P.S., A/C |
| L36 390 HP | IL | 4 speed |
| L36 390 HP | IM | 4 speed, A.I.R. |
| L36 390 HP | IQ | Powerglide |
| L36 390 HP | IR | Powerglide, A.I.R. |
| L72 425 HP | IP | 4 speed |

*A.I.R. = Air Induction Reaction smog reduction system

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method to determine if an automobile engine in an automobile is original, comprising:
collecting an image of at least one original factory applied marking of a first known original automobile engine; and
step of comparing at least one marking of the automobile engine to at least one original factory applied marking of the first known original automobile engine to determine if the at least one marking of the automobile engine is substantially the same to the at least one original factory applied marking of the first known original automobile engine.

2. The method of claim 1, further comprising:
collecting an image of the at least one original factory applied marking of a second known original automobile engine; and
comparing the at least one original factory applied marking of the first known original automobile engine to the at least one original factory applied marking of the second known original automobile engine to identify at least one common characteristic.

3. The method of claim 2, wherein determining if the at least one marking of the automobile engine is substantially the same as the at least one original factory applied marking of the known original automobile engine comprises determining if the at least one marking of, the automobile engine includes the common characteristic.

4. The method of claim 1, wherein collecting the image of at least one original factory applied marking of the first known original automobile engine includes collecting an image of an assembly code.

5. The method of claim 4, wherein collecting the image of the assembly code includes the step of collecting an assembly code that includes, at least in part, the character "F", "V", "H", "I" or "J".

6. The method of claim 5, wherein collecting the image of the assembly code includes the step of collecting an assembly code that includes, at least in part, a pair of characters selected from the group consisting of "IM". "IQ", "IR", "IF", "IP", "IK", "JC", "JF", "JD", "JG", "JE", "JA", "IU", "JH", and "IT".

7. The method of claim 4, wherein collecting the image of the assembly code includes collecting an assembly code from an automobile engine of at least 396 cubic inches in size.

8. The method of claim 7 wherein collecting the image of the assembly code includes collecting an assembly code from an automobile engine from a Chevrolet™ Corvette™ manufactured from 1957 through 1975.

9. The method of claim 2, wherein the identifying of at least one common characteristic includes identifying a characteristic selected from the group consisting of: size of characters, style of characters, boldness of characters, junctures between characters, angle of characters, spacing between characters, location of characters, and broach marks.

10. The method of claim 1, wherein collecting the image of at least one original factory applied marking of the first known original automobile engine includes collecting an image of an assembly code applied to the automobile engine at the factory where the automobile engine was built.

11. The method of claim 1, wherein collecting the image of at least one original factory applied marking of the first known original automobile engine includes collecting an image of at least a portion of a code that represents at least a portion of a vehicle identification number applied at the factory where the automobile was built.

12. A specific apparatus comprising: a storage medium having stored thereon at least one image of an automobile engine pad of a known original automobile engine, that, when accessed by a computing platform, allows a user to compare an image of an automobile engine pad of an unknown automobile engine to the at least one image of an original automobile engine pad of the known original automobile engine to determine if the unknown automobile engine is an original automobile engine.

13. The specific apparatus of claim 12, wherein the storage medium has stored thereon a plurality of images of automobile engine pads from a plurality of known original automobile engines.

14. The specific apparatus of claim 12, wherein the storage medium has stored there on an image of an automobile engine pad that comprises an image of an assembly code.

15. The specific apparatus of claim 14, where in the storage medium has stored there on the image of the automobile engine pad that comprises an image of an assembly code that includes, at least in part, one of the characters "F", "V", "H", "I" or "J".

16. An apparatus comprising:
a processing unit; and
a means to store an image of at least a portion of an original factory applied marking from an original automobile motor, wherein the apparatus is adapted to compare a representation of an unknown automobile motor to the image of at least the portion of the original factory applied marking from the original automobile motor to provide a confidence factor that the unknown automobile motor is original.

17. The apparatus of claim 16, further comprising an input device to receive the representation of the unknown automobile motor.

18. The apparatus of claim 17, wherein the input device is selected from the group consisting of a scanner, a camera, and a memory reader.

19. The apparatus of claim 16, wherein the apparatus is further adapted to compare at least one characteristic of the original factory applied marking from the original automobile motor, the characteristic selected from the group consisting of: size of characters, style of characters, boldness of characters, junctures between characters, angle of characters, spacing between characters, location of characters, and broach marks.

20. The apparatus of claim 19, wherein the apparatus is a device selected from the group consisting of: a personal computer, a digital camera, and a personal digital assistant.

* * * * *

(12) EX PARTE REEXAMINATION CERTIFICATE (8270th)
United States Patent
Grenning

(10) Number: US 7,738,672 C1
(45) Certificate Issued: May 24, 2011

(54) TECHNIQUES FOR VERIFYING THE AUTHENTICITY OF THE STEEL STAMPED INFORMATION ON AN ENGINE PAD OF A CLASSIC AUTOMOBILE AND APPARATUS THEREFOR

(76) Inventor: Albert R. Grenning, Boonville, NY (US)

Reexamination Request:
No. 90/009,790, Jul. 27, 2010

Reexamination Certificate for:
Patent No.: 7,738,672
Issued: Jun. 15, 2010
Appl. No.: 11/124,024
Filed: May 6, 2005

(51) Int. Cl.
*G06K 9/00* (2006.01)

(52) U.S. Cl. .................. 382/100; 382/109; 382/115
(58) Field of Classification Search .............. 382/141, 382/143, 152, 182
See application file for complete search history.

(56) References Cited

U.S. PATENT DOCUMENTS 5,067,162 A 11/1991 Driscoll
5,521,984 A * 5/1996 Denenberg et al. .......... 382/209
2003/0025811 A1 2/2003 Keelan

OTHER PUBLICATIONS

Grenning, Al, "Real Life 1963–1967 Engine Pads", The Corvette Restorer Magazine, Spring 1995, pp. 12–15, vol. 21, No. 4, published in USA.
Grenning, Al, "Looking At Engine Pads From A New Angle", The Corvette Restorer Magazine, Fall 1994, pp. 8–9, vol. 21, No. 2, published in USA.

* cited by examiner

*Primary Examiner*—Colin M LaRose

(57) ABSTRACT

Briefly, in accordance with one embodiment of the invention, a technique and device are described that may allow a user to determine if the engine in a classic or antique automobile is original. The common characteristics of the factory applied markings of known original engines may be identified. All or a portion of an unknown engine may then be compared to those common characteristics to determine if the unknown engine was likely stamped using the same stamping tool as the known original engines.

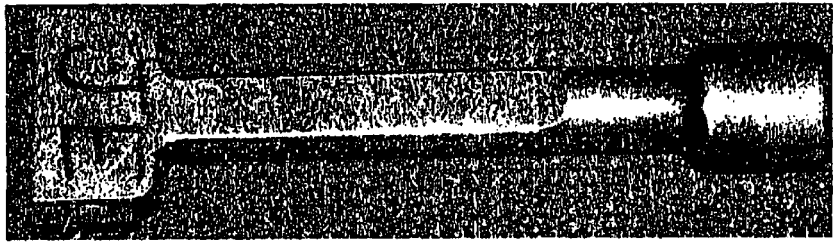

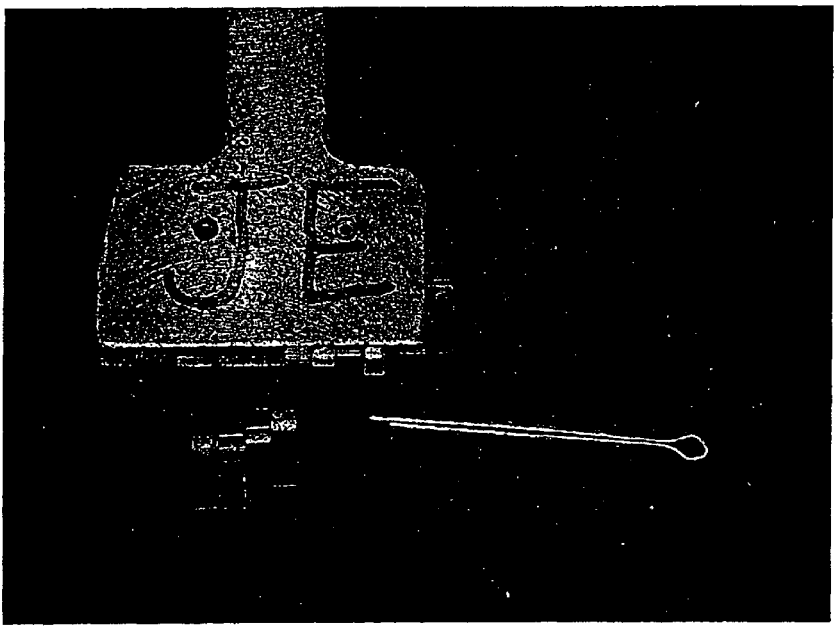

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-20 are cancelled.

* * * * *